Nov. 24, 1953  C. W. VOGT  2,660,098
APPARATUS FOR AND METHOD OF COMBINING ENWRAPMENTS
Filed Sept. 14, 1948  4 Sheets-Sheet 1

INVENTOR
Clarence W. Vogt
BY Evans & McCoy
ATTORNEYS

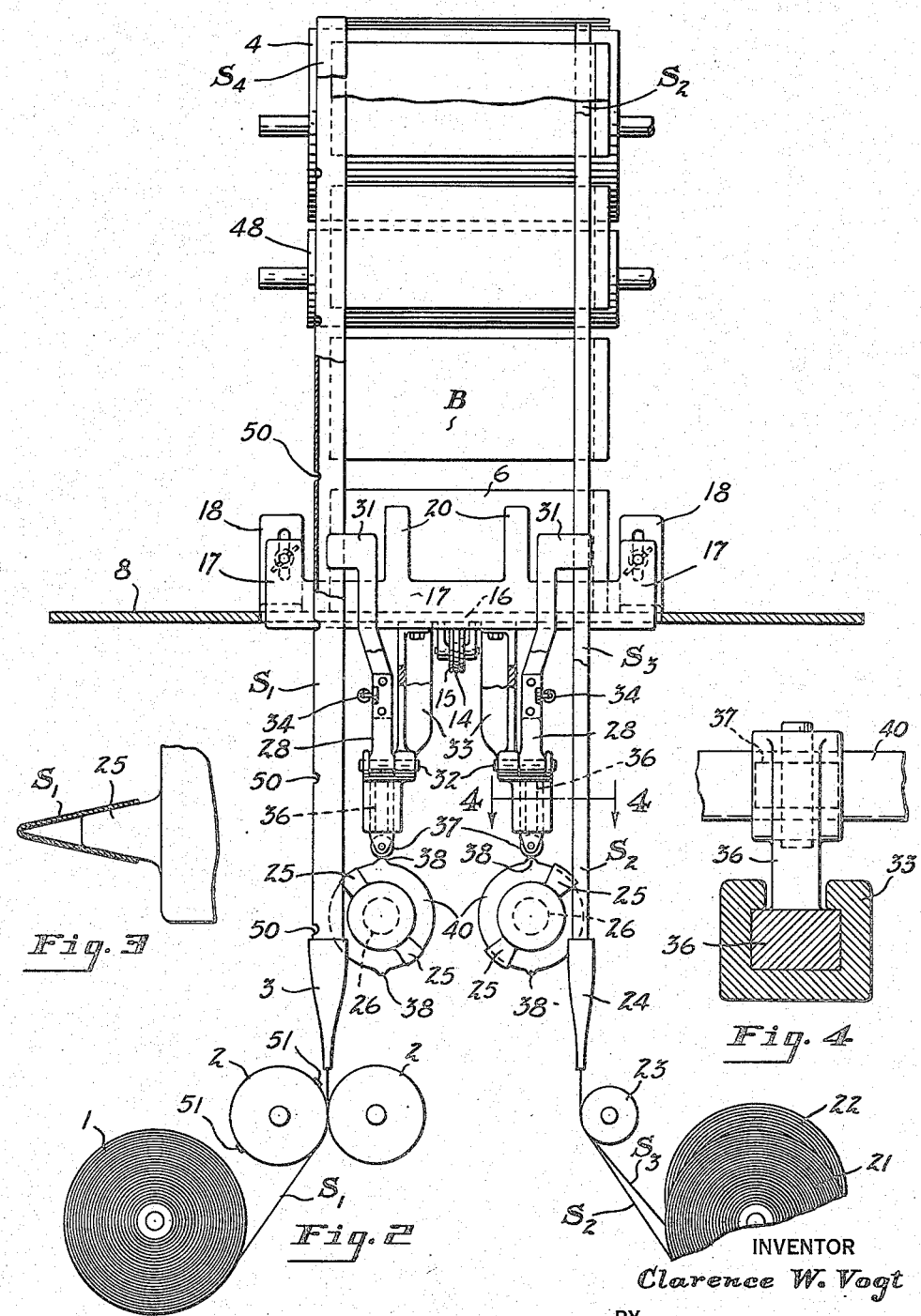

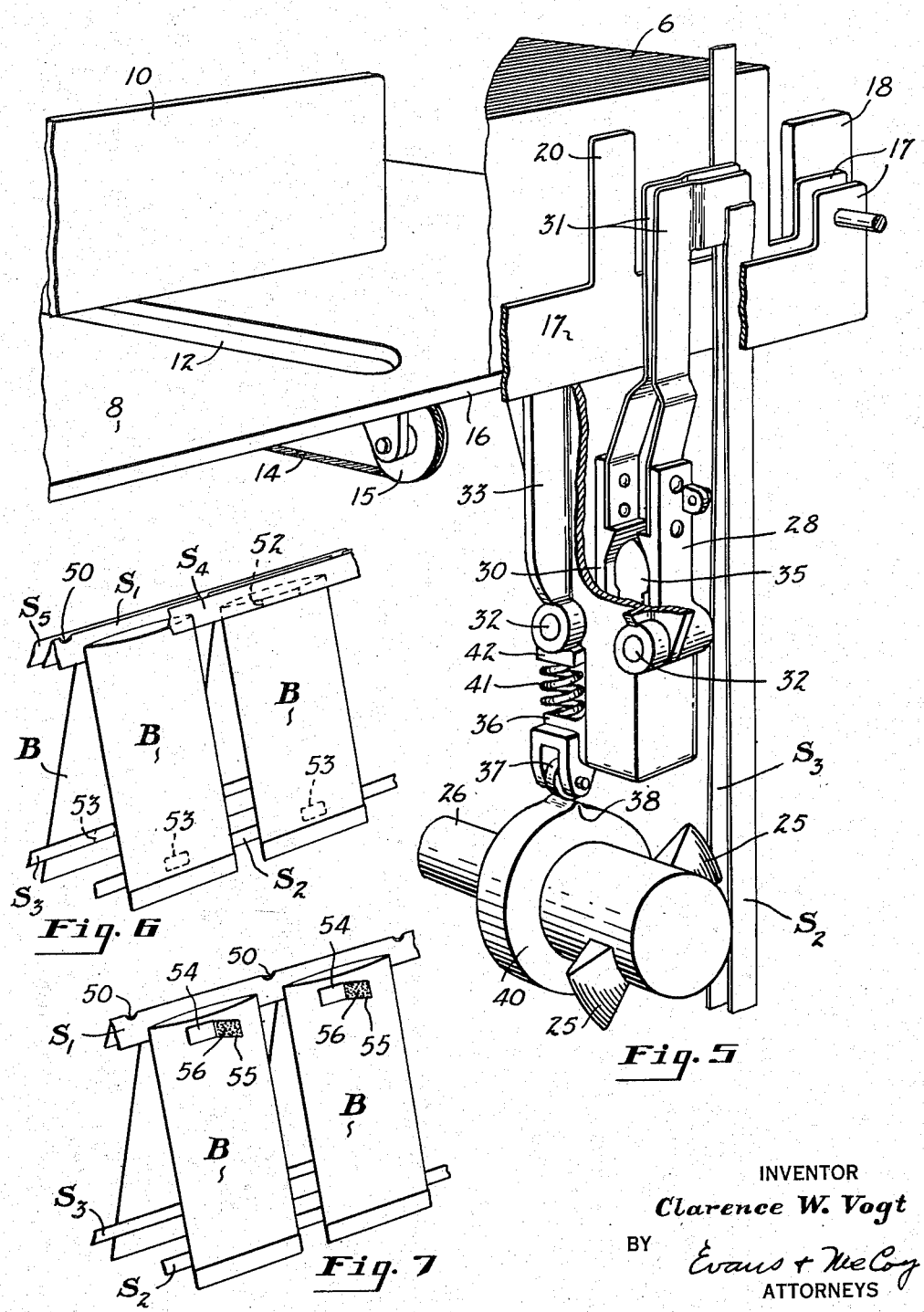

Nov. 24, 1953     C. W. VOGT     2,660,098
APPARATUS FOR AND METHOD OF COMBINING ENWRAPMENTS
Filed Sept. 14, 1948     4 Sheets-Sheet 4
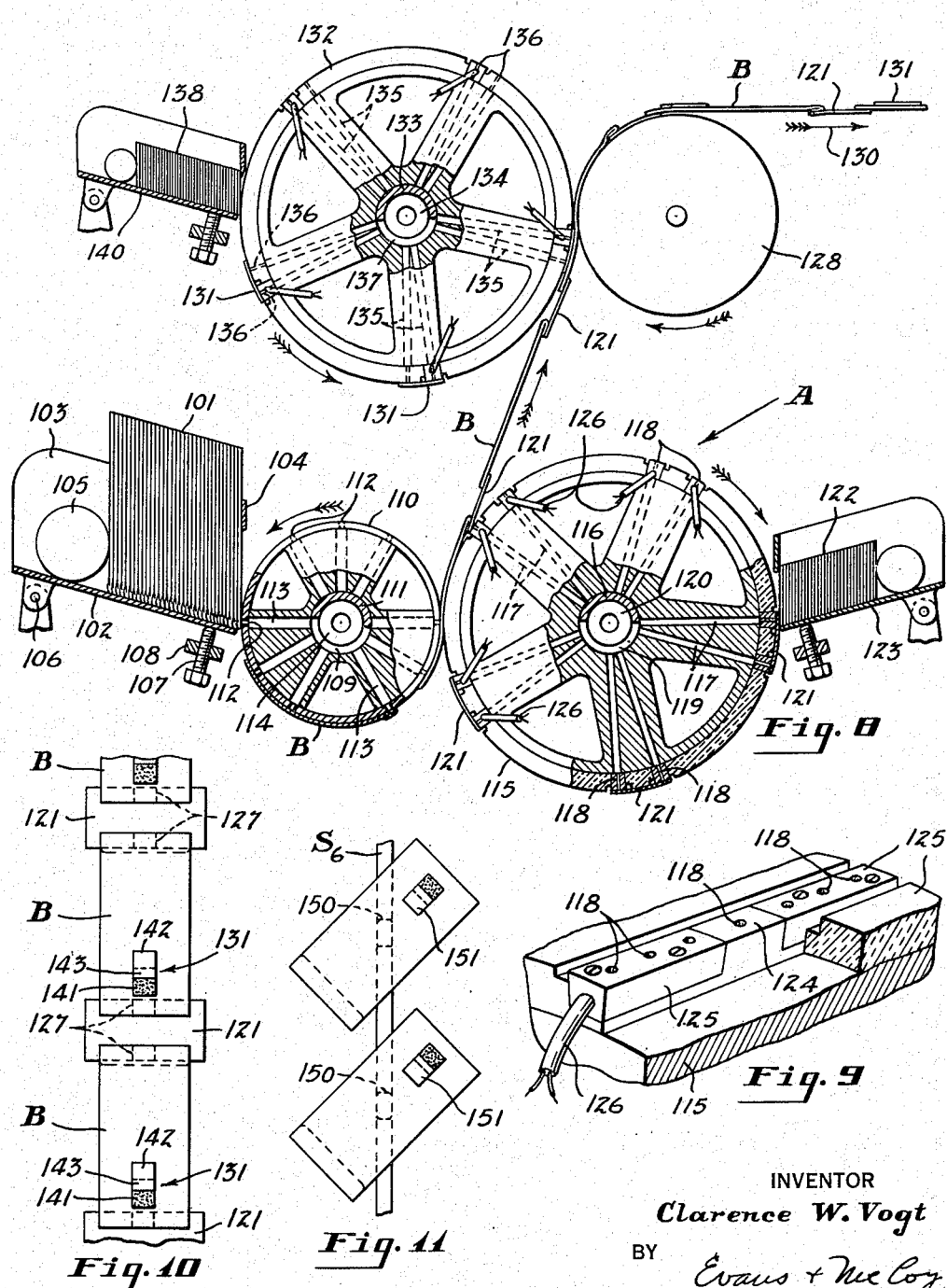
INVENTOR
Clarence W. Vogt
BY Evans + McCoy
ATTORNEYS Patented Nov. 24, 1953

2,660,098

UNITED STATES PATENT OFFICE 2,660,098

APPARATUS FOR AND METHOD OF COMBINING ENWRAPMENTS

Clarence W. Vogt, Norwalk, Conn.

Application September 14, 1948, Serial No. 49,277

7 Claims. (Cl. 93—1)

This invention relates to the manufacture of enwrapments and in particular to the assembling of preformed enwrapments into a series or chain, useful for packaging a wide variety of materials whether in a solid, liquid or plastic state at the time of packaging.

This application is a continuation-in-part of my copending application entitled Apparatus for and Process of Manufacturing Enwrapments, Serial No. 41,384, filed July 29, 1948, now Patent Number 2,626,544; and also a continuation-in-part of my copending application entitled Apparatus for and Method of Assembling Enwrapments, Serial No. 45,037, filed August 19, 1948.

It is an object of the present invention to provide a method of and apparatus for assembling tubular enwrapments into a series, utilizing a plurality of preformed enwrapments in the condition which they are received from present day commercial bag-making machinery.

Another object is to provide a method of and apparatus for assembling bags into a series or chain so that the bags may be successively fed to filling nozzles of packaging machinery thus obviating present difficulties incurred in feeding bags to packaging machinery for filling, and the handling of such bags during other packaging operations such as closing, sealing, etc.

A further object is to provide a method of and apparatus for assembling enwrapments in which the preformed enwrapments may be fed in stacks and in which chaining means may be advanced adjacent one or more of such stacks with means for removing the enwrapments from such stacks and securing them to the chaining means.

A still further object of the present invention is to provide a method of and apparatus for assembling enwrapments which may be readily utilized to form chains in which the enwrapments are disposed either longitudinally or transversely with respect to the chain.

Another object is to provide a method of and apparatus for assembling enwrapments in which a chain or series may be formed by the use of noncontinuous chaining means to secure adjacent bags together.

Another object of the present invention is to provide a method of and apparatus for assembling enwrapments in which the chains formed from individual enwrapments may be provided with handling elements in addition to the chaining elements to facilitate control of the enwrapments as they are advanced during packaging.

A further object is to provide a method of and apparatus for assembling enwrapments into chains or series in which the chaining elements or the handling elements or both may be detachably connected to the enwrapments for removal when they have served their purpose, or which may be permanently secured to the enwrapments and thus become a part of the final package where this is desired.

Other objects and advantages will become apparent from the following detailed description accompanied by the drawings in which:

Fig. 2 is a sectional view of the apparatus shown in Fig. 1 taken substantially on line 2—2 of Fig. 1;

Fig. 3 is a fragmentary sectional view of a heating element in contact with the chaining means to illustrate one way by which adhesive material on the chaining means may be activated to secure enwrapments thereto;

Fig. 4 is a fragmentary sectional view taken substantially on line 4—4 of Fig. 2;

Fig. 5 is an enlarged perspective view of a portion of the mechanism shown in Figs. 1 to 4 to illustrate its operation;

Fig. 6 is a perspective view of a portion of a chain or series of enwrapments produced by the apparatus shown in Figs. 1 through 5;

Fig. 7 is a perspective view of a portion of a modified form of chain or series of enwrapments embodying the present invention and which may be produced by slightly modifying the apparatus shown in Figs. 1 through 5;

Fig. 8 is a semi-diagrammatic elevational view with parts broken away illustrating a modified form of apparatus embodying the present invention;

Fig. 9 is an enlarged fragmentary perspective view obtained by viewing Fig. 8 in the direction of the arrow A;

Fig. 10 is a plan view of a portion of the chain produced by the apparatus shown in Fig. 8; and Fig. 11 is a plan view of a portion of a modified form of chain adapted to be produced on an apparatus similar to Fig. 8.

Figure 1:
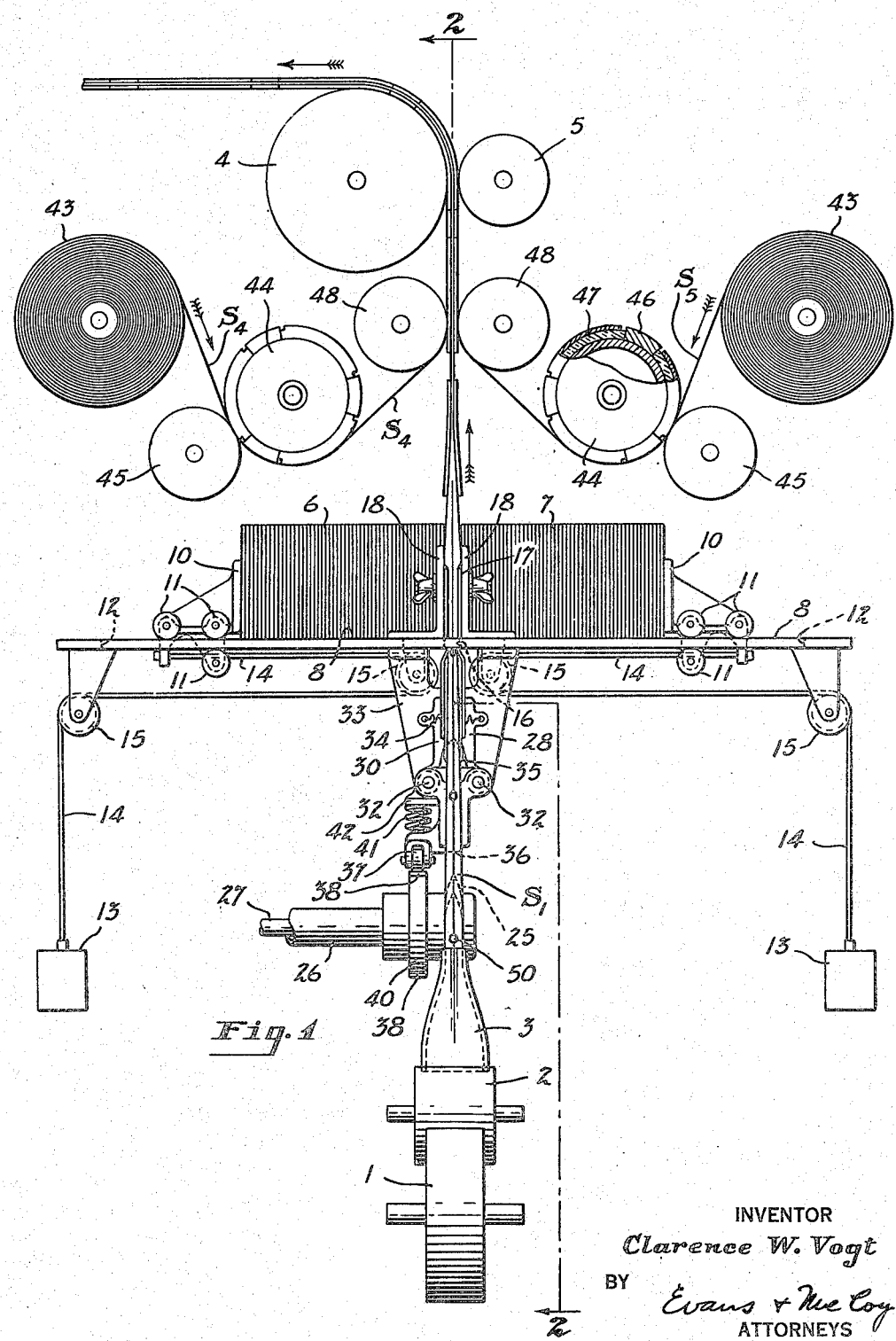
Figure 1 is an elevational view in semi-diagrammatic form of mechanism suitable for carrying out the present invention.

In essence the present invention comprises the provision of individual enwrapments in a suitable source of supply such as a stack from which the enwrapments may be individually withdrawn and contacted with chaining means advanced past the source of supply. The enwrapments are secured to the chaining means and further advanced therewith. The term "chaining means" as used in the present application covers the elements or members to which individual enwrapments are secured to provide a connected chain or series. Chaining means includes both elongated strip or tapes which may run continuously for the length of the chain and also includes the use of a plurality of elements or members to connect together portions of adjacent bags in the chain.

The apparatus illustrated in Figs. 1 through 5 utilizes elongated strips or tapes as the chaining means. The resultant chain comprises pairs of bags connected in series with the mouths of individual bags in the chain faced in the same direction so that the chain may be advanced to a filling apparatus and may present two bag mouths simultaneously. To secure the bags together and form the pairs of bags for connecting into the chain, any suitable method of pairing may be utilized. As shown in the drawings an elongated strip or tape having opposite surfaces provided with adhesive areas is one satisfactory way of accomplishing both the pairing and the chaining simultaneously.

In Figs. 1 and 2, the numeral 1 indicates a roll of elongated strip or tape from which a web of elongated strip material S-1 may be withdrawn. The material S-1 passes between a pair of rollers 2 having their peripheral surfaces in engagement. Next, the strip or tape S-1 passes through a creaser mechanism 3 which folds the strip S-1 substantially on its center line to provide a tape which is V-shaped in cross section. The strip S-1 then passes upwardly adjacent a source of supply of bags and thence between a drum or roll 4 and a roll 5. The rolls 4 and 5 may be driven in any suitable manner (not shown) in timed relation to provide the feed mechanism for advancing the strip S-1 as well as the other chaining and/or handling means which will be described later.

To assist in withdrawing the strip or tape S-1 the rolls 2 may also be driven in timed relation with the rolls 4 and 5. If desired the surfaces of the rolls 2, 4, and 5 may be suitably covered with a resilient material or otherwise provided with a surface which will grip the chaining means and advance the same therethrough without slippage. Since it is contemplated that the apparatus may be constructed to handle various types of materials, and various types of enwrapments, it is believed desirable to provide for adjustment between the axes of rotation of the rolls so that they will squeeze the material being fed therethrough with the desired pressure.

The numerals 6 and 7 in Fig. 1 indicate suitable sources of supply of the bags or enwrapments to be chained. As illustrated the sources of supply comprise stacks of bags 6 and 7 supported on one edge of a supporting surface or table 8. To suitably support the bags in position on the table 8 and to permit replenishing the stacks without interrupting operation, a back-stop or support member 10 may be provided for each of the stacks. Each of the members 10 may comprise a movable carriage with wheels 11 both above and below the supporting surface 8 so that it may ride along slot 12 in the surface 8 (see Fig. 5) to support the stacks 6 and 7 in any adjusted position.

To cause the bags to move in the direction of the location from which they are to be withdrawn and secured into a chain, pressure may be placed on the members 10. For example, suitable weights 13 may be provided and the force of the weight applied to the members 10 through cords or lines 14 which ride over pulleys 15 with the cords 14 being secured to the members 10, as shown clearly in Fig. 1.

At the opposite end of the stacks of bags 6 and 7 from the members 10, the table or supporting surface 8 is apertured providing edge surfaces 16 along the margin of the stacks so that the chaining means may pass through the table 8 adjacent the stacks of bags. The stacks of bags are supported adjacent the edges 16 by support members 17 which are adjustably mounted on brackets 18 carried by the table 8. If desired the supports 17 may extend only a relatively short distance above the table top 8 throughout most of their length having upstanding flanges or finger portions 20 extending to any desired height sufficient to properly support the stack of bags.

It may be seen from Fig. 2 that the strip or tape S-1 passes upwardly past the stacks of bags in the region of an end thereof which as will be seen later is preferably the mouth end of the bags when the bags are stacked on a side edge. Adjacent the opposite end of the bags additional chaining means may be disposed, which in the form of invention shown in Figs. 1 through 5 comprises elongated strip material. Obviously if a relatively short bag is being chained a pair of spaced chaining means may not be necessary.

The elongated strip material being fed in the region of the bottom portion of the bags is preferably a pair of strips or tapes which travel together and are treated in a manner similar to the tape S-1. Supply rolls 21 and 22 may be provided from which strips or tapes S-2 and S-3 respectively may be withdrawn. The supply rolls 21 and 22 are preferably mounted on a single shaft with the rolls in side by side abutting relationship. However, to facilitate illustration Fig. 2 shows the supply roll 22 as mounted about a higher axis of rotation than the supply roll 21. The tapes S-2 and S-3 when withdrawn from the supply rolls pass over a guiding roller 23 and through a creaser 24 which superposes the tapes one upon the other so that adhesive coatings on the tapes S-2 and S-3 may be disposed outwardly in opposite directions. These tapes are fed upwardly through the aperture in the table 8 adjacent the edge surfaces 16 and the stacks of bags 6 and 7 and around the drum 4 in a manner similar to the tape S-1.

As the tapes S-1, S-2 and S-3 pass upwardly between the stacks of bags 6 and 7, individual bags may be successively withdrawn from the stacks and secured to the tapes at intervals therealong in any desired manner. This may be done by the use of suitable fastening means or by providing the tapes with either spaced or continuous adhesive areas. Adhesive applying mechanism could be mounted to coat portions of the tapes with any suitable adhesive during travel of the tapes between the creasers 3 and 24 and the table 8. It is believed desirable to utilize tapes which have been coated with a suitable thermoplastic adhesive material. As the tapes pass toward the table heat may be applied to activate the adhesive to tacky condition at the desired areas.

Then these tapes may be brought into contact with an individual enwrapment in each of the stacks 6 and 7 and will adhere thereto sufficiently to withdraw an enwrapment from each stack and cause it to travel upwardly with the tapes to provide a chain or series of enwrapments.

The heating of the tapes to activate the adhesive may be done by any suitable mechanism. For example, as the tapes leave the creasers 3 and 24 rotary heater elements 25 mounted on shafts 26, may be provided and driven by any suitable mechanism preferably in timed relation with the balance of the operating mechanism. As may be seen in Figs. 2 and 3, these heater elements 25 may enter between the sides of the V-shaped tape S-1 and between the separate but superposed tapes S-2 and S-3 to heat and activate the thermoplastic adhesive material with which the tapes S-1, S-2 and S-3 may be coated. The shaft 26 which carries the heater elements 25 may be hollow to permit the circulation therethrough and through hollow portions of the heater elements of a heat transfer fluid supplied through conduit 27 shown in Fig. 1.

If desired the surfaces of the strips S-1, S-2 and S-3 may be completely coated with thermoplastic adhesive material. Such strips are particularly satisfactory where the enwrapments are of a type of material which shrinks or sticks when it is heated. Recently developed plastic films, such as polyethylene and polyvinylidene are considered excellent for packaging but are objectionable from the standpoint that they exhibit high shrinkage when heated. Enwrapments of such a material may be readily handled by the present invention by utilizing strip material completely coated with a suitable thermoplastic adhesive material having an activation temperature below the temperature at which such material softens or shrinks. Where the strip material chains enwrapments of these plastic materials only a portion of the area of the strip need be activated for chaining purposes. The strip material, however, may also be useful after it has accomplished its chaining function for sealing the end portions of an enwrapment comprising a tubular casing of the material by adhering the strip adjacent the edge of the tubing, folding it over upon itself and activating the strip completely to seal itself together and to the bag.

Where the bag material is of a type in normal use, such as wax paper, vegetable parchment, etc., it may be preferable to reduce the cost of the strips by providing only spaced areas of thermoplastic adhesive material on these strips. By proper disposition and timing of the feeding of the strip material the coated areas will be properly activated by the heater elements 25 to provide spaced adhesive areas in the locations where it is desired to secure individual bags to the strip material.

Thus, as the strips pass upwardly through the aperture in the table 8 and adjacent the edge surfaces 16 it is only necessary to deflect the tapes into contact with the bags causing adherence between the bags and the tape. Any suitable deflecting mechanism may be utilized. The drawings illustrate the use of pairs of pivotally mounted arms 28 and 30 each of which carries a leaf spring finger 31. The arms 28 and 30 are mounted for oscillation on pins 32 which pins are journaled in brackets 33 secured to the underside of the table 8. A suitable coil spring 34 is connected to each of the pair of arms 28 and 30 and tends to urge the arms together, consequently urging the leaf spring fingers 31 of each arm together in a position where they will not deflect the tapes S-1, S-2 and S-3. Intermittently and at appropriate timed intervals each of the pairs of arms 28 and 30 are oscillated to spread the same causing the leaf spring fingers 31 to spread and deflect the tapes into engagement with the innermost bags in the stacks 6 and 7 when viewing Fig. 1.

The spreading of the arms may be accomplished by a member 35 carried on a push rod 36 which slides in a guideway formed in each of the brackets 33 (see Fig. 4). At its lower end the push rods 36 carry follower rolls 37 which may be activated by projections 38 on cams 40 mounted for rotation on the shafts 26 which also carry the heater elements 25. As the cams 40 rotate the projections 38 thereon engage the follower rolls 37 causing the push rods 36 to lift and cause engagement of the members 35 with the arms 28 and 30 to oscillate them about the pins 32. This spreads the two pairs of fingers 31, one pair deflecting tapes S-2 and S-3 into engagement with a bag in each of the stacks 6 and 7 near the bottom thereof and the other pair deflecting the sides of the V-tape S-1 into engagement with top portions of the same two bags. After the follower rolls 37 have terminated their engagement with the projections 38 of the cams 40, suitable coil springs 41 which engage a portion on the push rod 36 and the lugs 42 on the brackets 33 will cause the push rods 36 to return to their normal position, permitting the pairs of fingers 31 to converge to a non-deflecting position.

When the bags are secured to the chaining means by an adhesive material as has been described, it is generally desirable to utilize a thermoplastic adhesive material of the type which might be termed a "delayed action" adhesive. This means that after the adhesive material has been activated by heat and becomes tacky it will retain its tackiness for an appreciable time even though the adhesive material has an opportunity to cool below its activation temperature before adherence is obtained. As shown in Fig. 2 this permits the location of the heating elements 25 at a distance below the spring fingers 31 which cause adherence of the strip material to the bags. However, it is believed preferable to locate the heating elements as close as is reasonably possible to the point where adherence is to be obtained to insure a secure connection. For example, the tips of the fingers 31 may be heated to insure adherence, when simultaneous pressure and heat are required for firm attachment between tapes and bags.

A thermoplastic adhesive material is also considered desirable from the standpoint that when a suitable adhesive is utilized the connection of the chaining means to the individual bags can be detachable in character. Thus, after the chain has been fed to filling apparatus to advance the bags to their filling or closing or sealing position, the connection between the chaining means and the bag may be heated to reactivate or soften the thermoplastic material thus permitting the chaining means to be peeled or otherwise severed from the bag.

As the tapes S-1, S-2 and S-3 pass above the stacks of bags, the pairs of bags which have been secured thereto will be carried upwardly as a chain. The members of each pair of bags are secured together by the V-tape S-1 and the bags are secured into a chain by their connection to the tapes S-1, S-2 and S-3 which tapes are disposed between each pair of bags. In some cases it is considered desirable to add to such a chain, handling means or handling elements to facilitate control of the individual bags during their advancement to packaging apparatus. For example, when a bag is fed to a filling nozzle it is desirable to provide a handling element to control the bag, to properly position it with respect to the filling nozzle and to assist in opening the mouth of the bag to permit entry of the filling nozzle. Such handling elements may be detachably located in the region of the mouth of the bag and at a spaced location from the connection of the bag with the chaining means. Thus, separation of the chaining means and handling element will cause the bag mouth to open.

To carry out this purpose the drawings illustrate apparatus disposed above the table 8 to apply additional elongated strip material to the exterior of each of the bags in the region of the mouth.

Supply rolls 43 feed webs of strip material or tapes S-4 and S-5 to feed rolls 44 and 45 having their peripheries in engagement to grip the strip and advance it. Where the tapes S-4 and S-5 are to be secured to the bags by a suitable thermoplastic adhesive material, the feed rolls 44 may be provided with heated segments or sections 46 with intervening insulated segments or sections 47 to transmit heat to the strips S-4 and S-5 at suitable spaced areas and thus activate to a tacky condition thermoplastic adhesive on the surface of the strips. As the strips S-4 and S-5 leave the heated feed rolls 44 after traveling therearound for a portion of their periphery, the strips S-4 and S-5 are applied to the outwardly disposed surfaces of the bags in the region adjacent the mouth thereof. This application may be accomplished by pressure rollers 48 which roll the tapes S-4 and S-5 onto the bags and at the same time may press the tapes firmly against the bags to assure adequate adherence thereto. After leaving the pressure rolls 48 the completed chain passes over the drum 4 and may be transferred to a location where it may be rolled onto a reel or manifolded, stacked or the like. The completed chain may be sold as an article of commerce or transferred to packaging machinery for filling.

It is contemplated that prior to rolling, the chain may be opened so that the bags will lie flat with their mouth portions facing each other connected by the tape S-1 which will be unfolded to a flat configuration and the chain may be rolled in this position. In this event it may be desired to omit the use of the tapes S-2 and S-3 in the region of the bottom of the bag. The handling and advancing of such a chain is illustrated in Figs. 1 through 3 of my copending application Serial No. 41,497, filed July 30, 1948, now Patent Number 2,626,544.

Figure 6 illustrates a completed chain made by the apparatus shown in Figs. 1 through 5 with the individual bags B secured into a chain in pairs with the mouth of each bag in a pair connected to one side of the V-tape S-1 at a point adjacent the mouth of the bag and with lower portions of the bags of each pair connected to elongated strips S-2 and S-3 so that the bottom portions of the bags may be supported and controlled as the chain is advanced. In addition the strips or tapes S-4 and S-5 are secured to the exterior surfaces of each of the bags to facilitate controlling of the bags and opening of the bag mouths.

As shown in Fig. 6 the strip or tape S-1 is provided with perforations indicated by the numeral 50 and these perforations may be disposed along the crease or folded edge of the tape S-1. These perforations serve as registry indicia to permit accurate feeding of the chain while it is being advanced. A star wheel having finger-like elements which enter and engage the perforations may be provided to accurately advance the chain. The perforations 50 may be formed as the strip S-1 is withdrawn from its supply roll 1 by providing one of the rolls 2 in Fig. 2 with punch elements 51 which engage recesses or apertures in the other of the rolls 2 to perforate or aperture the strip S-1. If desired the rolls 2 may also be provided with mechanism to crease or weaken the midline of the tape S-1 at the apex of the V so that if it is desired to separate the bags of each pair during or after filling or sealing this may be readily done by tearing the tape or severing it with a rotary knife or the like.

The size of the adhesive area connecting the strips or tapes with the bags may be of any suitable dimensions sufficient to securely adhere the bags and strips together. In the case of a plain envelope type bag such as disclosed in Fig. 6 it is preferable that the adhesive area, at least in the region of the mouth end of the bag, be relatively small and disposed approximately midway of the sides of the bag. The adhesive area between the strip S-4 and the bags may be as indicated by the numeral 52 in Fig. 6 so that as the strip S-4 is separated from the strip S-1 the midportion of the bag will be pulled outwardly to open the mouth of the bag as wide as possible. Similarly the connection between the bag and the strip S-1 should be correspondingly of relatively small transverse extent to facilitate opening the bag mouth. Further, since it will be generally preferable to remove the strips after they have served their purpose the connection between the strips S-2 and S-3 and the bags may also be small but of sufficient size to obtain adequate adherence. The adhesive area connecting the strips S-2 and S-3 with the bags is indicated in Fig. 6 by the numeral 53.

Fig. 7 illustrates a modified form of chain which differs from that shown in Fig. 6 by the replacement of the elongated strips S-4 and S-5 with handling elements or tab members 54. The tab members 54 may be applied to the bags after they have been chained by the elongated strips or taps S-1, S-2 and S-3 by replacing the mechanism for feeding and affixing the strips or tapes S-4 and S-5 with labeling mechanisms of conventional design. Such mechanisms may be of existing conventional design to detach and feed individual labels, a portion of the surface of the label being provided with an adhesive material to cause the label to adhere to the bag. As may be seen in Fig. 7 the tab members 54 may be provided with a flange or free end portion 55 not adhered to the bag and which may extend outwardly from the bag to be gripped by any suitable mechanism to facilitate control of the bags during filling, closing, sealing, etc.

If desired the outwardly directed face of the flange portion 55 may be coated with any suitable adhesive material to facilitate gripping thereof in handling and controlling the bag. Preferably, the adhesive material utilized to connect the tab member 54 to the bag may be thermoplastic. Then if it is desired to remove the tab member this adhesive connection may be heated to soften or reactivate the thermoplastic material and severance of the tab member may be readily accomplished. The adhesive material which may be provided on the exterior surface of the flange portion 55, as indicated by the stippled area 56 in Fig. 7, may be of the same nature as that used to connect the tab to the bag or may be of a different nature. When such an adhesive area is utilized it is believed preferable that it have different characteristics from the adhesive used to adhere the tab to the bag so that activation of one adhesive area will not cause the other adhesive area to become tacky.

The apparatus shown in Fig. 8 is a modified form of apparatus for producing a chain or series of enwrapments in which the chaining means do not extend continuously along the chain as do the elongated strips S-1, S-2 and S-3 shown in Figs. 6 and 7. In this case the chaining means comprise members or strips secured to adjacent end portions of adjacent bags in the chain or series.

The numeral 101 indicates a stack of bags supported on a supporting surface or table 102 having side wall portions 103 and a restraining or supporting member 104 adjacent the edge of the supporting surface 102 from which individual enwrapments are to be successively withdrawn. The member 104 may be suitably spaced above the surface 102 to support upper portions of the stack 101 and to hold the stack in place on the supporting surface. To maintain the bags in position for withdrawal and support the rear portion of the stack, a cylindrical weight or bar 105 may be provided which may roll along the supporting surface 102. To facilitate proper withdrawal of the individual bags the table 102 may be mounted for oscillation about a pivot point 106 and at its other end the table may be supported on a set screw 107 threadedly mounted in a nut 108 carried by the frame of the apparatus and held against rotation. Disposed adjacent the supporting surface 102 is a drum or vacuum wheel 110 rotatably mounted on a stationary shaft 111. The drum or wheel 110 has a solid periphery with spaced apertures or ports 112 disposed at spaced locations thereabout. These ports communicate with radially disposed passages 113 which extend inwardly through the drum 110 and open adjacent the periphery of the stationary shaft 111.

The stationary shaft 111 is provided with a central axial passage 114 one end of which may be sealed and the other end connected to an exhaust pump (not shown) to withdraw air from the hollow central portion of the shaft. In the region of the radial passages 113 the shaft 111 is provided with an opening or slot 109 therethrough extending for a substantial portion of the periphery of the shaft. Thus, during a portion of the rotation of the wheel 110 the radial passages 113 are in communication with the central passage 114 of the shaft and air is exhausted therefrom. This creates a vacuum at the ports 112 sufficient to withdraw individual bags successively from the stack 101 and this vacuum commences when the passages 113 register with the beginning of the slot 109. Looking at Fig. 8 it will be noticed that this occurs when the ports 112 are adjacent the table 102 and stack of bags 101. The bags withdrawn from the stack 101 are carried by the vacuum around the periphery of the wheel 110 until the ports 112 are no longer in communication with the central passage 114 of the stationary shaft due to the travel of the radial passages 113 past the end of the slot 109.

Suitably disposed adjacent the drum or wheel 110 is a similar drum or wheel 115. The vacuum drum 115 similarly rotates about a stationary shaft 116 and is provided with radial passages 117 which terminate in ports 118 disposed in rows on the periphery of the drum. The stationary shaft 116 is provided with a hollow passageway 120 which may also be exhausted in any suitable manner. The shaft 116 similar to the shaft 111 has an opening or slot 119 therethrough for an appreciable portion of its periphery to place the radial passages 117 and ports 118 into communication with the passage 120 and permit the drum 115 to withdraw individual chaining elements 121 from a stack 122 of such elements carried by a supporting surface or rack 123 which is similarly constructed and adjustable in the same manner as the table 102. By applying a vacuum to the ports 118 the two end portions of one of the chaining elements 121 may be supported on the drum 115 and carried around the drum as it rotates.

While traveling around the drum two spaced areas of the chaining element 21 may be heated by heated sections 124 which heated sections are isolated by insulated areas 125 (see Fig. 9). The heated sections may obtain their heat in any suitable manner, the drawings illustrating the use of resistance heaters which may be connected to a source of electricity by wires, portions of which are indicated by the numeral 126. Only a portion of the wires are shown in the drawings since these electrical connections suitable to provide a flow of electricity to the sections 124 are well known and do not require a detailed explanation.

By utilizing chaining elements 121 coated with a suitable thermoplastic adhesive material those portions of the elements 121 which cover the sections 124 will be heated to activate similar areas of the thermoplastic adhesive material. Then, as the drum 115 rotates into engagement with the bags carried by the drum 110 the chaining elements 121 with their activated adhesive areas are applied to adjacent end portions of two individual bags carried on the drum 110 and adhered thereto to connect the bags into a chain.

Fig. 10 discloses a chain or series of bags thus produced and it will be seen that the chaining elements 121 are secured to adjacent end portions of the bags B in the areas indicated by the numeral 127. The chain thus formed may then be fed upwardly from the drums 110 and 115 around a drum or roller 128 which may be driven in any suitable manner or may be an idler roll to guide the chain as it passes in the direction of the arrow 130 where the chain may be rolled on a reel or manifolded until it is to be used for packaging purposes.

If desired handling elements 131 may be secured to the individual bags of the chain to facilitate control of the bag during its advancement to packaging machinery. To accomplish the securing of the handling elements 131 a vacuum drum or wheel 132 similar to the drums 110 and 115 may be provided adjacent the roller 128 as shown in Fig. 8. The drum 132 rotates about a stationary shaft 133 having a central axial passage 134 therethrough from which air may be withdrawn by any suitable exhaust means. The drum 132 may also be provided with radial passages 135 which terminate in ports 136 on the periphery of the drum. The shaft 133 may be provided with an aperture or slot 137 to place the ports 136 and radial passages 135 in communication with the central passage 134 of the shaft 133 during a portion of the peripheral travel of the ports 136.

Thus, the ports may withdraw handling elements 131 individually from a stack 138 supported on a rack or supporting surface 140 similar to the racks 102 and 123. Further, a portion of the periphery of the drum 132 may be provided with heated portions to activate a thermoplastic adhesive material on the handling elements 131 as they travel around the periphery of the drum 132. The drum 132 applies the handling elements 131 to the bags B as they are supported on the periphery of the drum 128 to secure the handling elements to the bags.

The completed chain produced by the apparatus shown in Fig. 8 is illustrated in Fig. 10 and it will be seen that the handling elements 131 are adhered to each of the bags at a location spaced from the connection of the bag with the chaining element 121. As shown the handling elements are adhered to an opposite side face of each bag from the location of the connection of the bag and the chaining element. When the chain is advanced, gripping of the handling elements 131 will serve to control the bags and in particular to open the bag mouths as they approach the filling nozzle.

The handling elements 131 may be of any desired construction, however, it is believed preferable to utilize a tab having an end portion 141 thereof secured to the bag. At its opposite end the tab may be provided with an end portion 142 having an adhesive coating thereon on its outwardly facing surface opposite from the surface by which the end portion 141 is secured to the bag. Also between the end portions 141 and 142 an intervening portion 143 may be provided and preferably this intervening portion 143 is not provided with adhesive material on either of its surfaces. Thus in advancing the chain the individual bags may be controlled by gripping the end portion 142 of the tab having an outwardly disposed adhesive surface. This outwardly disposed adhesive surface may be used to facilitate gripping of the tab member.

It is also contemplated that a chain such as shown in Fig. 10 may be readily combined with a similar chain by securing the end portions 142 to the bags of the other chain. The intervening portion 143 preferably not coated with adhesive material, is advantageous in that it may be used as a supporting surface for supporting the bags by the handling element. For example, the end portion 142 may be gripped by any suitable means or connected to another bag and the intervening portion 143 may ride along a bar or rail of a conveyor or the like. Also, the intervening portion 143 may provide a surface for gripping the bag to lift it or transfer it by providing a surface which may be readily contacted by fingers or other mechanism.

The size, shape and location of the handling element 131 with respect to the bags may be determined according to the packaging mechanism and also may be varied to conform to the requirements of the packaging job. Similarly, the chaining elements 121 may be of any desired size and shape. As shown in Fig. 10 the chaining elements 121 extend beyond the transverse width of the bags and may be suitable for use as a label on the completed package. The chaining elements 121 may be completely coated with a suitable thermoplastic adhesive material and for the purposes of chaining the individual bags together the areas 127 only may be activated. After the bags have been filled, sealing may be accomplished by removing one of the bags connected by the chaining element so that it will remain secured adjacent the mouth of the other bag. By heating the entire surface of the chaining element the thermoplastic adhesive material will be activated to a tacky condition and the chaining element or label 121 may be folded over upon itself adhering to itself and to the bag mouth providing a sealed portion completely surrounding the top and sides of the bag mouth. Such a closure provides an extremely satisfactory sift-proof and air-tight seal for the bag.

If desired, the handling elements 131 may be removed when packaging is completed or may remain secured to the bag for use in suspending the bag from a display rack such as by inserting the free end portion 142 into a slit or aperture in the surface of the display rack.

The modified form of chain illustrated in Fig. 11 comprises a series of bags B secured in a chain by the use of an elongated strip or tape S-6 which may be adhered to each of the bags throughout an area indicated by the numeral 150. Such a chain may be readily produced by supporting the stack of bags to be chained in a rack disposed at an angle as illustrated in Fig. 11. The strip material S-6 may be fed vertically adjacent the stack and individual bags withdrawn from the stack and secured to the strip or tape S-6. If desired handling elements 151 similar to the handling elements 131 in Fig. 10 may be secured to each of the bags. The form of chain shown in Fig. 11 is believed to be advantageous, particularly for use in connection with filling apparatus having filling nozzles carried by a drum which rotates about a vertical axis. When a chain such as that shown in Fig. 10 is advanced to filling apparatus of this type it will be fed in a vertically upward direction and when the bags engage the filling nozzles they change their direction of travel and move horizontally. By the use of a chain such as that disclosed in Fig. 11 the bags may be fed in an angular direction to the filling nozzle and the required change in direction will be less than when the bags are fed vertically.

Chains similar to that shown in Fig. 11 having the bags disposed diagonally may also be made with the bags paired. If the rack supporting the stack of bags were tilted at an angle equal but opposite from that in Fig. 11, the resulting chain could be readily combined with the chain in Fig. 11 by adhering the handling elements of the two single chains together. By combining the two oppositely tilted chains, the double chain would then have all the bags disposed at the same angle and capable of use for feeding bags diagonally to apparatus having two filling nozzles.

While the drawings show the present invention in connection with a simple form of envelope bag, it will be understood that numerous other enwrapments may be utilized. Bags having infolds or pleats along their side edges, or laminated bags, or bags of heat sealable material may all be advantageously combined in accordance with the invention.

It is also contemplated that the position of the bags in the stacks may be varied to advantage. In Figs. 1 through 5 the bags are supported in stacks along a side edge thereof and form a chain which, as shown in Figs. 6 and 7, may be readily fed in a horizontal direction with the bag mouths all facing upwardly. In Fig. 8 it may be seen that the bags are supported on their bottom edges and are withdrawn bottom first for chaining. When such a chain is completed and rolled on a reel and then unrolled for use in packaging the bags will be in proper position with their mouth ends forward for advancement to filling apparatus.

It will be obvious that many other variations and modifications from those shown and described for purposes of explanation and illustration may be made without departing from the spirit of the present invention.

What I claim is:

1. The method of assembling enwrapments which comprises successively withdrawing individual enwrapments from a source of supply and feeding the same in a series along a predetermined path, advancing a series of chaining elements adjacent said path, securing each of said chaining elements to adjacent portions of individual enwrapments disposed in said series, and securing a handling element to each of said enwrapments at a point on said enwrapments spaced from the connection of said enwrapment with said chaining element.

2. Apparatus for assembling enwrapments which comprises a supporting surface to hold a plurality of separate enwrapments, a second supporting surface to hold a plurality of separate chaining elements, withdrawing means to successively withdraw individual ones of said enwrapments, means to move the withdrawing means continuously to advance the enwrapments in a predetermined path in spaced relation, withdrawing means to withdraw individual ones of said chaining elements and successively advance them into superposed position with respect to portions of adjacent enwrapments, and means for adhering spaced portions of each of said chaining elements to the adjacent sides of said adjacent enwrapments.

3. Apparatus for assembling enwrapments which comprises a supporting surface to hold a plurality of individual enwrapments, a second supporting surface to hold a plurality of individual chaining elements, withdrawing means to successively withdraw individual ones of said enwrapments, means to move the withdrawing means continuously to advance the enwrapments in a predetermined path in spaced relation, withdrawing means to withdraw individual ones of said chaining elements, means to move the last named withdrawing means continuously to advance the chaining elements continuously into superposed position with respect to portions of adjacent enwrapments, and means for adhering spaced portions of each of said chaining elements to the adjacent sides of said adjacent enwrapments.

4. Apparatus for assembling enwrapments which comprises a supporting surface to hold a plurality of individual enwrapments, a second supporting surface to hold a plurality of individual chaining elements, withdrawing means to successively withdraw individual ones of said enwrapments, means to move the withdrawing means continuously to advance the enwrapments in a predetermined path in spaced relation, withdrawing means to withdraw individual ones of said chaining elements and successively advance them into superposed position with respect to portions of adjacent enwrapments, heating means on one of the said withdrawing means, and means for adhering spaced portions of each of said chaining elements to the adjacent sides of said adjacent enwrapments.

5. Apparatus for assembling enwrapments which comprises a supporting surface to hold a plurality of individual enwrapments, a second supporting surface to hold a plurality of individual chaining elements, a rotatable drum to transfer enwrapments from the first supporting surface to a chaining position, means on the drum to hold enwrapments thereto, withdrawing means to withdraw individual ones of said chaining elements and successively advance them into superposed position with respect to portions of enwrapments at the chaining position, and means for adhering spaced portions of each of said chaining elements to the adjacent sides of said adjacent enwrapments.

6. Apparatus for assembling enwrapments which comprises a supporting surface to hold a plurality of individual enwrapments, a second supporting surface to hold a plurality of individual chaining elements, a rotatable drum to transfer enwrapments from the first supporting surface to a chaining position, means on the drum to hold enwrapments thereto, a second rotatable drum to transfer chaining elements from the second supporting surface to the chaining position and apply them in superposed position with respect to portions of enwrapments at the chaining position, means on the second drum to hold chaining elements thereto, and means for adhering spaced portions of each of said chaining elements to the adjacent sides of said adjacent enwrapments.

7. Apparatus for assembling enwrapments which comprises a supporting surface to hold a plurality of enwrapments, a second supporting surface to hold a plurality of chaining elements, a rotatable drum to transfer enwrapments from the first supporting surface to a chaining position, means on the drum to hold enwrapments thereto, a second rotatable drum to transfer chaining elements from the second supporting surface to the chaining position and apply them in superposed position with respect to portions of enwrapments at the chaining position, means on the second drum to hold chaining elements thereto, heating means on the second drum to heat at least portions of the chaining elements, and means for adhering spaced portions of each of said chaining elements to the adjacent sides of said adjacent enwrapments.

CLARENCE W. VOGT.

References Cited in the file of this patent

UNITED STATES PATENTS

| Number | Name | Date |
|---|---|---|
| 1,474,913 | Radzinsky | Nov. 20, 1923 |
| 2,013,844 | Sherman | Sept. 10, 1935 |
| 2,028,341 | Masterson et al. | Jan. 21, 1936 |
| 2,206,043 | Novick | July 2, 1940 |
| 2,221,617 | Steen | Nov. 12, 1940 |
| 2,257,829 | Winkler et al. | Oct. 7, 1941 |
| 2,400,759 | Katz | May 21, 1946 |